US008444542B2

(12) United States Patent
Ostkamp et al.

(10) Patent No.: US 8,444,542 B2
(45) Date of Patent: May 21, 2013

(54) GEAR APPARATUS FOR A CENTRIFUGE INCLUDING A DRIVE SHAFT HAVING TWO HOLLOW LONGITUDINAL CHANNELS FOR LUBRICATING THE GEAR APPARATUS VIA AN ASSOCIATED LUBRICANT COMPENSATING SYSTEM

(75) Inventors: Wilhelm Ostkamp, Oelde (DE); Richard Neubauer, Wadersloh (DE)

(73) Assignee: Gea Westfalia Separator GmbH, Oeide (DE)

( * ) Notice: Subject to any disclaimer, the term of this patent is extended or adjusted under 35 U.S.C. 154(b) by 147 days.

(21) Appl. No.: 12/933,251

(22) PCT Filed: Mar. 17, 2009

(86) PCT No.: PCT/EP2009/053135
§ 371 (c)(1),
(2), (4) Date: Oct. 25, 2010

(87) PCT Pub. No.: WO2009/115516
PCT Pub. Date: Sep. 24, 2009

(65) Prior Publication Data
US 2011/0034312 A1 Feb. 10, 2011

(30) Foreign Application Priority Data

Mar. 20, 2008 (DE) .......................... 10 2008 015 134

(51) Int. Cl.
*B04B 1/20* (2006.01)
*B04B 9/08* (2006.01)
*F16C 33/66* (2006.01)

(52) U.S. Cl.
USPC ................... 494/14; 494/15; 494/53; 494/83; 494/84

(58) Field of Classification Search
USPC ....... 494/7–9, 14, 15, 52–54, 83, 84; 184/6.1, 184/6.12; 210/380.1, 380.3
See application file for complete search history.

(56) References Cited

U.S. PATENT DOCUMENTS

| | | | | |
|---|---|---|---|---|
| 3,407,902 A | * | 10/1968 | Musser | 184/6.12 |
| 4,941,866 A | * | 7/1990 | Gorodissky et al. | 494/14 |
| 5,772,573 A | * | 6/1998 | Hao | 494/15 |
| 6,981,940 B2 | * | 1/2006 | Rafferty | 494/7 |
| 8,302,737 B2 | * | 11/2012 | Yanohara et al. | 184/6.1 |
| 2011/0034312 A1 | * | 2/2011 | Ostkamp et al. | 494/14 |

FOREIGN PATENT DOCUMENTS

| | | |
|---|---|---|
| DE | 1 009 865 | 8/1954 |
| DE | 1 918 130 | 11/1969 |
| DE | 1 782 548 | 9/1971 |
| DE | 103 34 370 | 2/2005 |
| DE | 20 2005 001 539 | 7/2006 |
| EP | 0 409 791 | 1/1991 |
| WO | 2004/097255 | 11/2004 |
| WO | 2005/011871 | 2/2005 |

* cited by examiner

*Primary Examiner* — Charles E Cooley
(74) *Attorney, Agent, or Firm* — Barnes & Thornburg LLP

(57) ABSTRACT

A gear apparatus for a solid-bowl screw centrifuge. The gear apparatus includes a shaft, a gear, and a bearing. The centrifuge inclndies a drum and a screw, both of which are configured to be driven. The screw is further configured to be driven at a different rotational speed relative to the drum. The gear apparatus is connected between one or more drive motors and the screw and the drum. The gear apparatus is continuously filled with a lubricant and includes a hollow drive shaft having two hollow longitudinal channels extending in an axial direction. Also included is a lubricant compensating system having a lubricant compensating container connected via a line and a rotary lead-through for lubricating the bearing through the two hollow longitudinal channels.

21 Claims, 7 Drawing Sheets

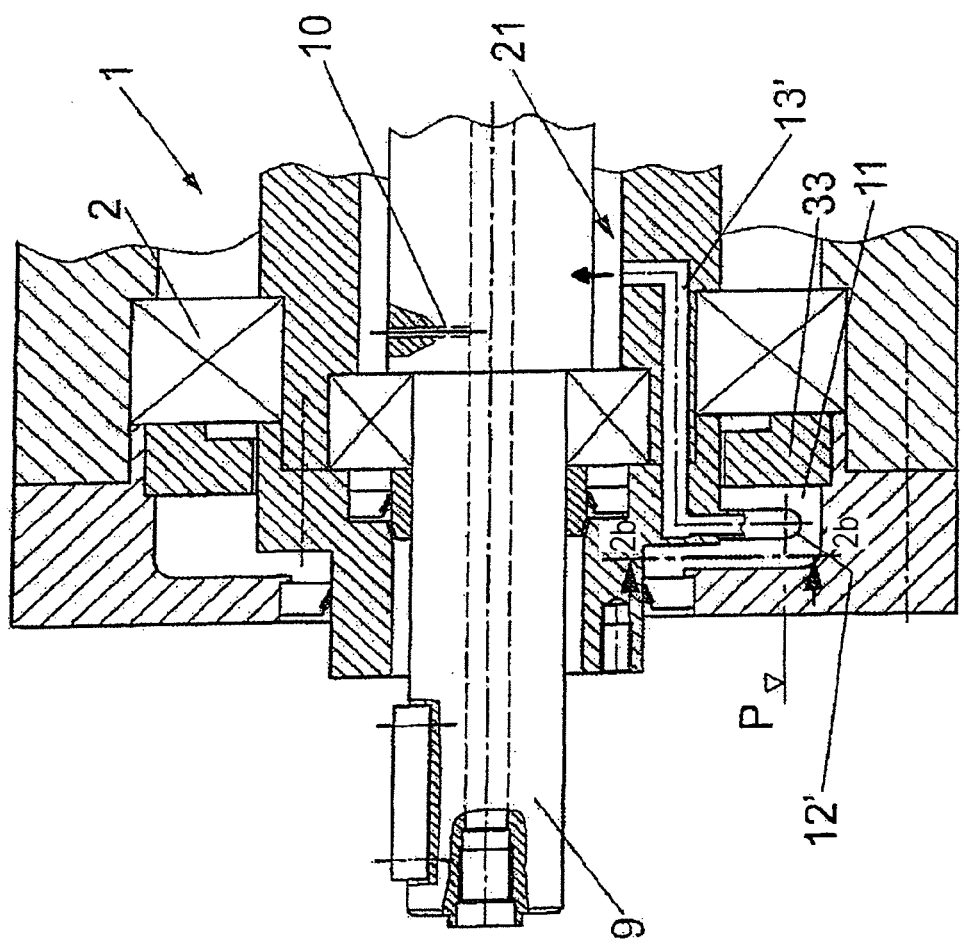
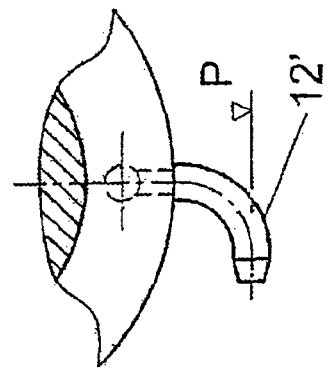
FIG. 2a
FIG. 2b

GEAR APPARATUS FOR A CENTRIFUGE INCLUDING A DRIVE SHAFT HAVING TWO HOLLOW LONGITUDINAL CHANNELS FOR LUBRICATING THE GEAR APPARATUS VIA AN ASSOCIATED LUBRICANT COMPENSATING SYSTEM

BACKGROUND OF THE INVENTION

This application is a national stage of International Application PCT/EP2009/053135, filed Mar. 17, 2009 and claims benefit of and priority to German Patent Application No. 10 2008 015 134.3, filed Mar. 20, 2008, the content of which Applications are incorporated by reference herein.

BACKGROUND OF THE INVENTION

The present disclosure relates to a gear apparatus for a centrifuge, such as a solid bowl screw centrifuge. The solid bowl screw centrifuge includes a drum to be driven and a screw to be driven at a differential rotational speed relative to the drum. The gear apparatus is connected between at least one or more drive motors and the screw and the drum and the gear apparatus is continuously filled with an oil-type free-flowing lubricant.

For driving decanters, for example, solid bowl screw centrifuges, use is made of gear apparatuses which are connected downstream of the drive motors and have elements which rotate at the rotational speed of the drum.

In decanter gear apparatuses which are continuously filled with oil, it is not readily possible to check the filling level or add more gear oil during ongoing operation. Leaks, for example toward the product space, can be detected only when the apparatus is stationary during maintenance work. In addition, in the decanter of the type in question, an elevated pressure can build up in the gear. It is desirable to avoid this.

With regard to the technological background, reference is made to WO 2004/097255 A2, DE 19 18 130 A, DE 20 2005 001 539 U1, DE 103 34 370 A1, EP 0 409 791 B1, DE 1 009 865 A1 and DE 1 782 548 A.

Against the background of the problem described above, the gear apparatus, according to the present disclosure, addresses this problem.

Thus, the present disclosure relates to a gear apparatus for a solid-bowl screw centrifuge. The centrifuge includes a drum and a screw, both of which drum and screw are configured to be driven and the screw is further configured to be driven at a different rotational speed relative to the drum. The gear apparatus is connected between one or more drive motors and the screw and the drum. The gear apparatus is continuously filled with a lubricant and includes a hollow drive shaft having at least one hollow channel. An associated lubricant compensating system includes a lubricant compensating container. The lubricant compensating container is connected via a line to the at least one hollow channel.

Accordingly, as noted above, the gear apparatus has associated with it a lubricant compensating system, in particular a lubricant compensating circuit, with a lubricant compensating container which is connected via a line to at least one hollow channel of a drive shaft of the gear apparatus. The drive shaft is embodied as a hollow shaft.

In order to compensate for any losses of oil and in order to promptly obtain during operation an indication of an existing leak, an oil compensating container is installed above the gear apparatus. The oil compensating container is connected to the oil volume in the gear via a rotary lead-in, the transfer point being located axially and centrally on the drive shaft of the gear. If oil is lost in the gear, oil can run out of the container into the gear. Damage is thus prevented in a simple manner.

In addition, the gear apparatus of the present disclosure avoids differences in pressure or prevents pressure from building up in the gear apparatus during heating in a manner that might lead to "breathing" and possibly the infiltration of dirt/water.

In addition, oil losses become more reliably detectable. It is thus possible to visually detect a loss of oil before the gear apparatus is jeopardized.

In addition, possible contamination of the material to be centrifuged is impeded, particularly in the case of an internal gear.

In addition, it is possible to add more oil into the gear apparatus during ongoing operation if production has to be maintained.

Nevertheless, in an implementation of a drive concept with motors mounted on the end side and coaxially with the drive shaft, referred to as a direct drive, the concept of the central rotary lead-in is possible only with relatively great technical effort. However, motors with a hollow shaft can be used, the hollow shaft being an advantageous element according to the present disclosure.

If the rotary lead-in is positioned in such a way that it surrounds the hollow drive shaft, the oil has to enter the hollow shaft via a hole in the lateral surface. It is within the scope of the present disclosure to form this hole radially and thus to encounter a hole or line in the center of the shaft that then leads to the gear apparatus volume.

Nevertheless, when the gear housing is stationary, the rotating drive shaft attempts to pump oil out of the gear apparatus into the compensating container, since the oil is outwardly accelerated in the radial hole of the shaft. If the suction is sufficiently high, oil flows out and air is drawn into the gear apparatus under the dynamic seals. It is possible to avoid this effect if an equivalent radial hole is arranged at the inner end of the drive shaft.

A further problem exists in the fact that it is not possible to reliably rule out loss of oil in the gear apparatus. If, for example, the gear apparatus contains a relatively large air bubble, then the holes in the drive shaft are empty and the oil would have to enter the shaft from the outside counter to the centrifugal force.

In order to achieve reflowing of the oil, the oil would have to be pressurized in a controlled manner in the container. This is impracticable.

These further problems can be solved by the gear apparatus, according to the present disclosure, by providing a drive shaft which is designed as a hollow shaft and has two axially extending oil holes which, according to an embodiment of the present disclosure, are drilled eccentrically and obtain transverse holes positioned next to one another. It is also within the scope of the present disclosure to form one of the oil holes centrically and the other eccentrically or, for example, coaxially with the first oil hole.

The transverse holes are drilled onto the longitudinal holes so as to be laterally offset and oblique relative to one another, such as in accordance with the peeling disk principle.

It is advantageous if the transverse holes are formed independently of the direction of rotation in such a way that one channel pumps and one draws in. When the housing rotates, a correspondingly designed rotary lead-through provides a defined system. That is, oil is conveyed into the gear apparatus in a targeted manner and air is conveyed out. This arrangement has a plurality of advantages.

To begin with, it is operative independently of the direction of rotation.

In addition, it allows air to be brought safely out of the gear apparatus.

In addition, the solution, according to the present disclosure, can be implemented in a simple manner in designs having a secondary motor arranged on the end side for driving the screw. It is particularly suitable for lubricating the gear apparatus with oil instead of fat.

If the two channels in the rotary lead-through are uncoupled from each other by an intermediate seal and connected via two hoses, a passage and cooling are also conceivable within the scope of the present disclosure.

Embodiments of the present disclosure are further discussed below.

Other aspects of the present disclosure will become apparent from the following descriptions when considered in conjunction with the accompanying drawings.

BRIEF DESCRIPTION OF THE DRAWINGS

FIG. 2a is a sectional view of a partial region of a second embodiment of a gear apparatus and FIG. 2b is a view along line 2b-2b of FIG. 2a, according to the present disclosure.

FIG. 3a is a sectional view of a partial region of a third embodiment of a gear apparatus, according to the present disclosure.

FIGS. 3b-e are sectional views through various axial regions of a drive shaft of the gear apparatus of FIG. 3a.

FIG. 5a is a sectional view of a partial region of fourth embodiment of a gear apparatus, according to the present disclosure and FIGS. 5b-e are sectional views through various axial regions of a drive shaft of the gear apparatus of FIG. 5a.

DETAILED DESCRIPTION

Figure 1:
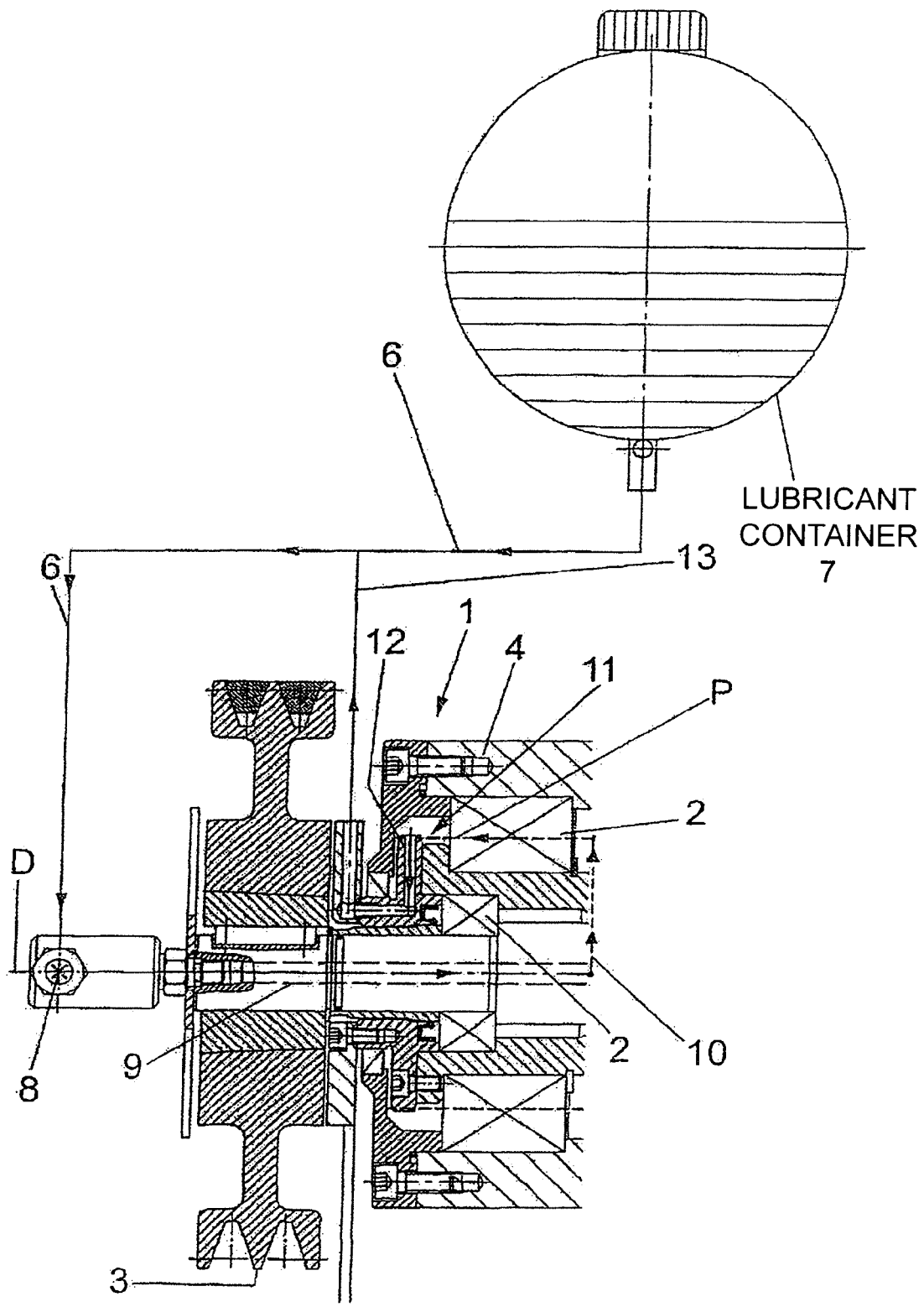
FIG. 1 is a sectional view of a partial region of a first embodiment of a gear apparatus including an associated lubricant compensating container, according to the present disclosure.

FIG. 1 is a sectional view of a gear apparatus 1 of a solid bowl screw centrifuge. With regard to the construction of such a solid bowl screw centrifuge, see, for example, FIG. 6.

Figure 6:
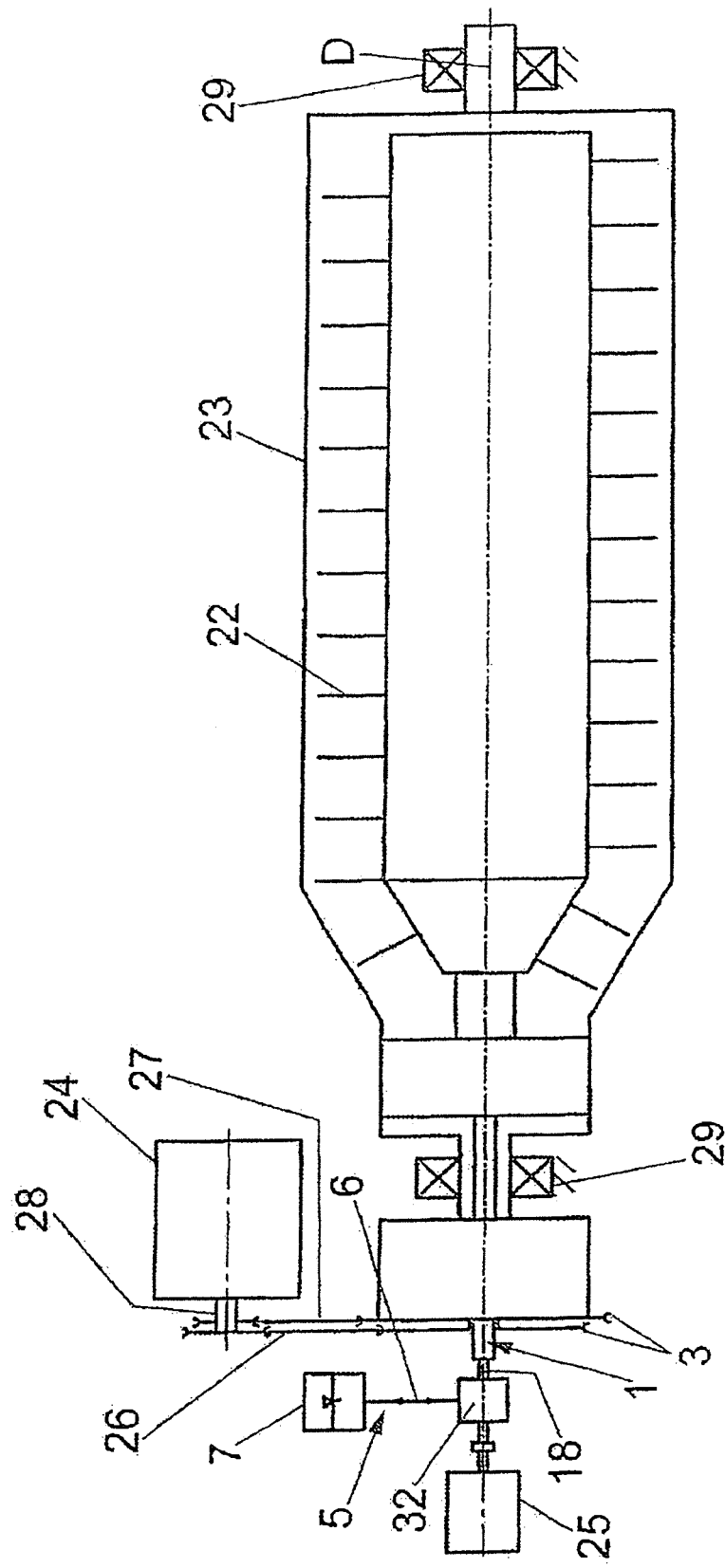
FIGS. 6 and 7 are schematic illustrations of two embodiments of solid bowl screw centrifuges, according to the present disclosure.

The solid bowl screw centrifuge of FIG. 6 has a screw 22 and a drum 23. The gear apparatus 1 is connected between at least one or two drive motors 24, 25.

When installed, the gear apparatus 1 may be oriented in such a way that rotating parts of the gear apparatus 1 each have horizontally oriented axes of rotation. The main axis of rotation of a central drive shaft 9, 18 is denoted by D. See, for example, FIGS. 1, 3, 5 and 6. The elements to be lubricated of the gear apparatus 1 include a plurality of bearings 2.

The gear apparatus 1 is designed as a gear apparatus which is continuously filled with lubricant, such as oil. It is constructed in various manners and may have one or more gears each having at least one or more gear stages which can be designed, for example, as planetary gear stages or the like.

For feeding torque, one or two pulleys 3 are coupled to output shafts 4, 28 of the drive motors 24, 25 via drive belts 26, 27, as shown, for example, in FIGS. 1 and 6.

The output shafts 4 may each be coupled in a rotationally fixed manner to the drum 23 and a screw body of the screw 22.

As shown in FIG. 6, drive motor 25, which serves to drive the screw 22, is arranged directly in an axial extension of the drive shaft 18. This creates a type of direct drive for the drive shaft 18 on which, for example, a driving or braking moment for the screw 22 is introduced into the gear apparatus 1.

The gear apparatus 1 serves to generate a differential rotational speed between the screw 22 and the drum 23. Drum bearings are located at the two axial ends of the drum 23 and are designated with the reference numeral 29.

For lubricating elements to be lubricated of the gear apparatus 1, for example, lubricating bearings 2, use is made of a free-flowing lubricant, for example, an oil, which can be guided into the gear apparatus 1 using a type of lubricant compensating system, such as, for example, lubricant compensating circuit 5.

The lubricant compensating circuit 5 has a line 6, such as shown, for example, in FIGS. 1 and 6. Arranged at an end of line 6, which is remote from the gear apparatus 1, is a lubricant compensating container 7 which is filled up to a certain level with the lubricant and is arranged at a sufficient level above the gear apparatus 1. The level of oil in the lubricant compensating container 7 may be at all times higher than the highest point to be supplied with oil in the gear apparatus 1.

The other end of the line 6 opens via an axial rotary lead-through 8 in an axial extension of a hollow shaft 9, as shown, for example, in FIG. 1. Shaft 9 serves as a drive shaft for the drive motor 25, similar to that shown in FIG. 6. Hollow shaft 9 of the gear apparatus 1 can be designed in one or more pieces and axially penetrates one or more of the gears and/or gear stages of the gear apparatus 1.

The lubricant can be guided in such a simple manner axially into the region of all of the elements to be lubricated, for example, the bearings 2, of the gear apparatus 1.

Via channels 10 branching off, for example, radially from the hollow shaft 9, the lubricant can flow to the elements of the gear apparatus 1 that are to be lubricated and from which it enters. This can be, for example, via axial and/or radially extending connecting spaces or channels 10, or one or more annular spaces 11 extending parallel to axis of rotation D.

In order to implement a circuit, a radial oil level P in the space 11 is limited by a conveying means, such as, for example, a peeling disk-like element 12 or a scoop tube, which does not rotate or is stationary during operation. That is so that it can be used in the manner of a centripetal pump to pump lubricant away out of the rotating system, to begin with radially inward and then into a discharge line 13 extending radially outward.

The discharge line 13 opens, between the lubricant compensating container 7 and the gear apparatus 1, into the line 6.

This arrangement with a peeling disk or centripetal pump-like element 12 and the feed line 6 in hollow shaft 9 as a feed line 6 of the lubricant compensating circuit 5, allows a defined oil level to be set in a simple manner in the gear apparatus 1 while at the same time supplying the inner rolling bearings 2.

The lubrication of the elements to be lubricated of the gear apparatus 1 is in this way ensured in a simple manner.

FIG. 2 shows an advantageous and additional embodiment of a gear apparatus 1 of a solid bowl screw centrifuge, according to the present disclosure.

In this embodiment, lubricant is discharged from a radially outer region of the gear apparatus 1 into a radially inner region of the gear apparatus 1. That is done via a conveying means, such as a peeling disk-like element, or in this case a type of scoop tube 12'. A discharge line 13', from the scoop tube opening runs back into a radially internal space 21 of the gear apparatus 1. This is advantageous, as a lower oil pressure generally prevails in the center than further outward, as the gear apparatus 1 can be connected here to an oil or lubricant compensating container 7, such as shown in FIG. 1, and only low centrifugal forces prevail. The inflow into the annular space 11, for setting a lubricant surface area P, can be influenced by suitable dimensioning of a restrictor 33.

FIG. 3a shows a partial region of another embodiment of a gear apparatus 1, according to the present disclosure, and similar to the embodiment of FIG. 1 except for the manner in which the lubricant is fed into the gear apparatus 1. In particular, a feed line 6 from lubricant compensating container 7 is provided as part of a lubricant compensating circuit 5 of the decanter gear apparatus 1 which container 7 is continuously filled with oil.

Figure 3:
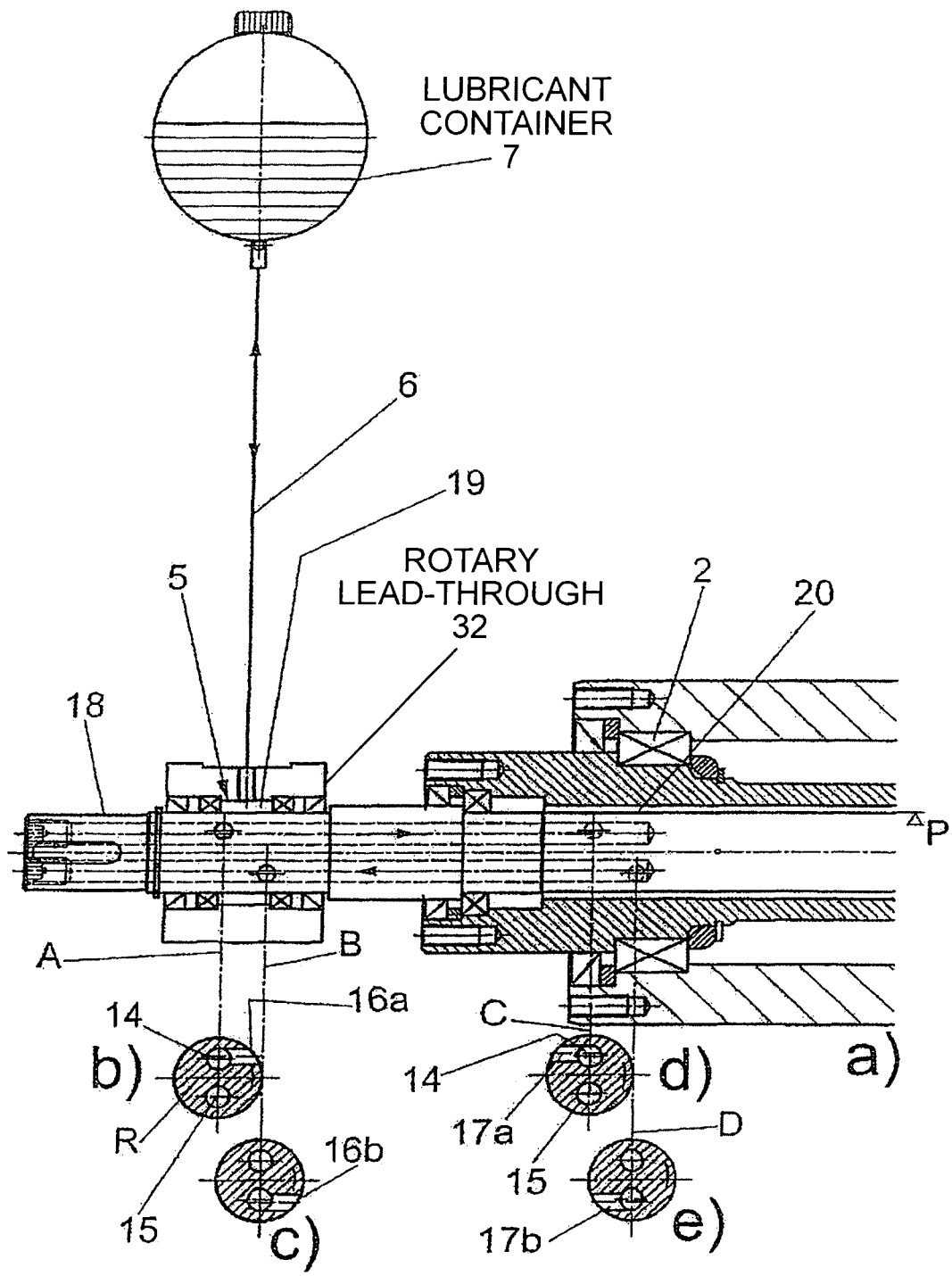
Figure 4:
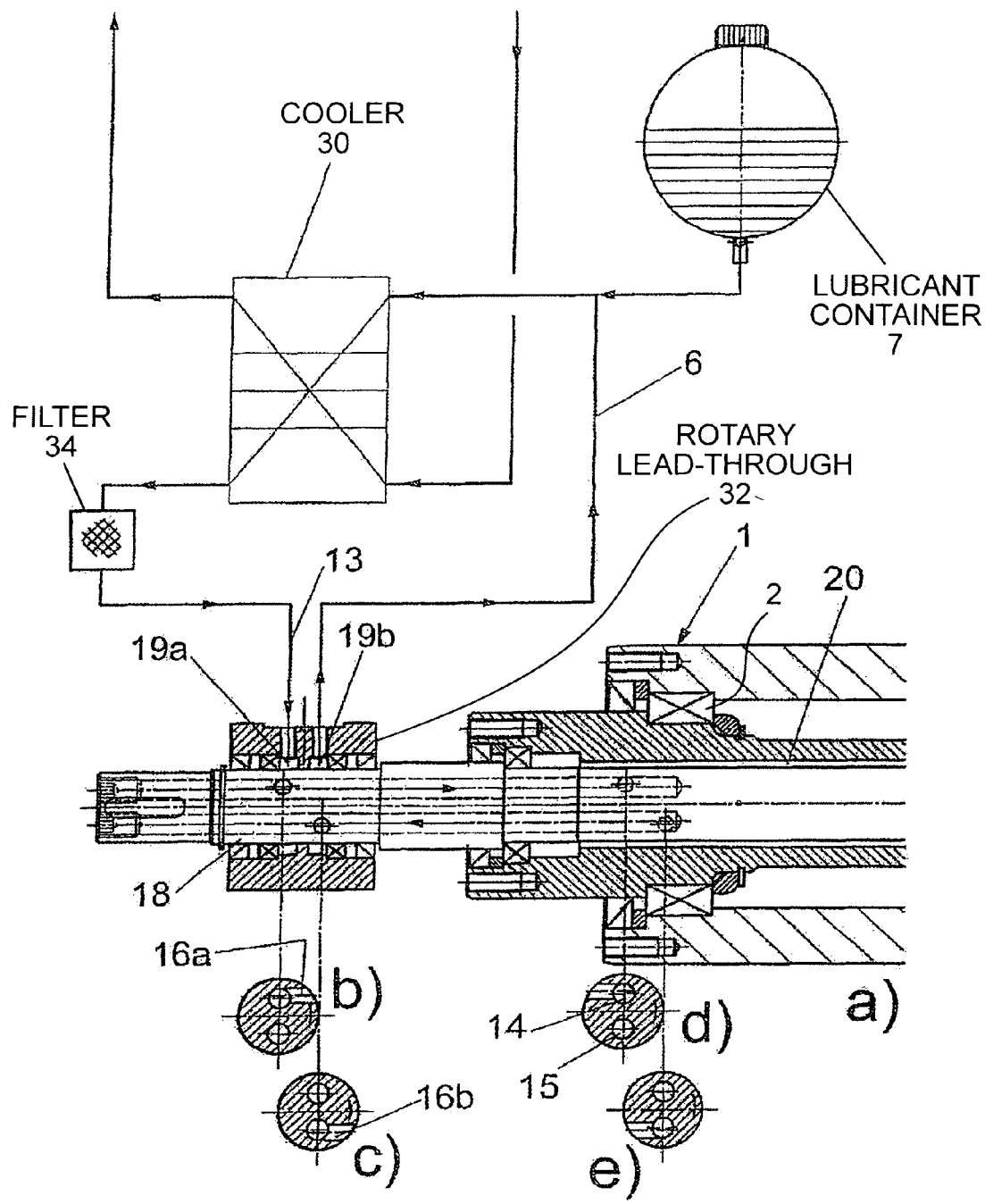
FIGS. 4a-e are sectional views through a partial region of the third gear apparatus of FIG. 3a and including a cooling device, according to the present disclosure.

In contrast to FIG. 1, in which the torque is fed via pulleys 3, provision is made in the embodiments of FIG. 3 and FIG. 4 for the drive shaft 18, (not shown in FIG. 4) which is embodied as a hollow shaft, to be coupled, for feeding the driving moment for screw 22, to drive motor 25 for the screw 22 in the axial extension of the main axis of rotation D of the gear apparatus 1, the drive motor 25 being designed as a direct drive (see FIG. 6).

Figure 5:
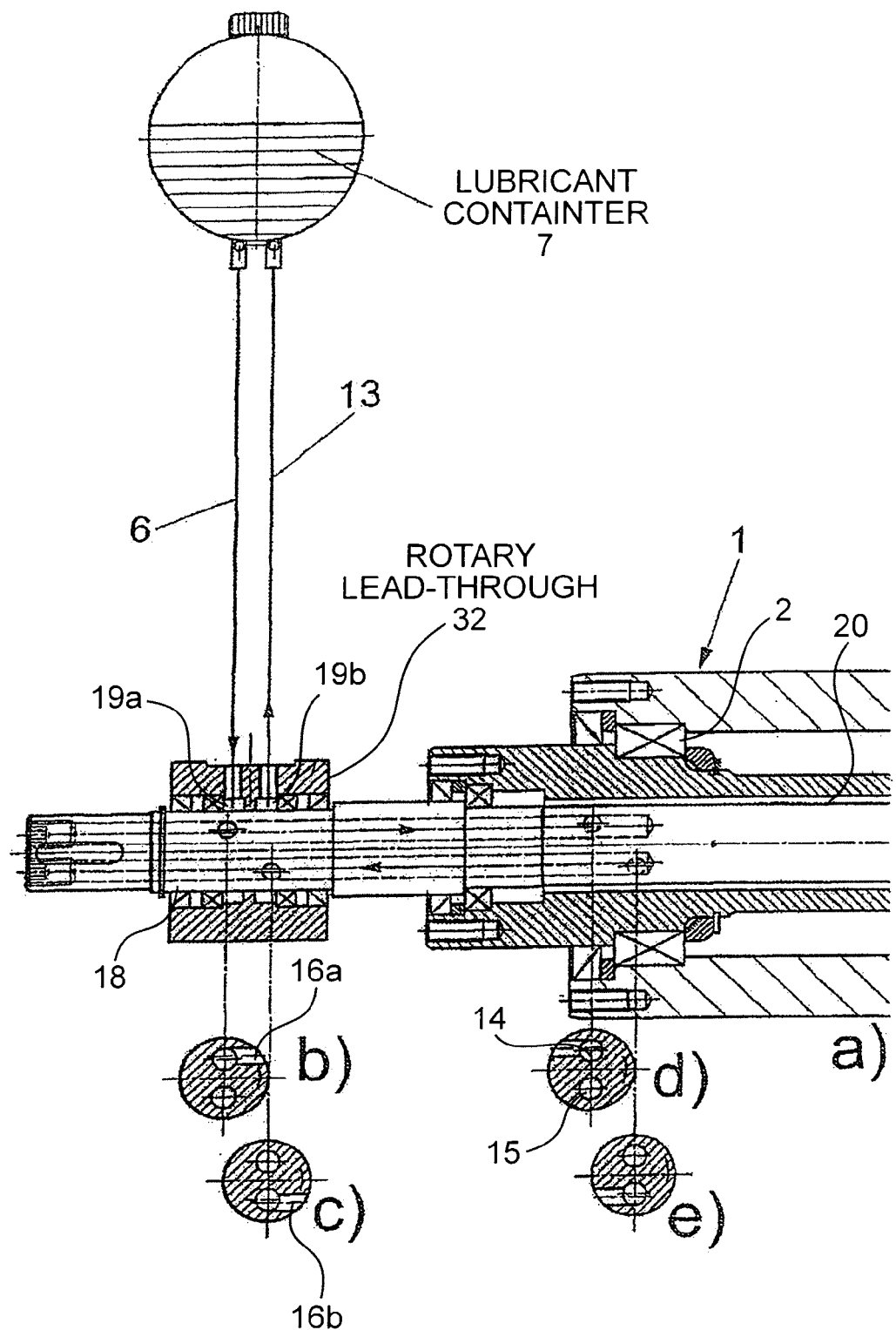

The embodiments of FIGS. 3, 4 and 5 may be made to implement the oil feed line 6 and, if appropriate, an air discharge line, where oil can be contained in the air, not into the drive shaft 18, which shaft 18 may be hollow, from the axial direction but rather through transverse holes 16a, b, 17a, b, which extend at an angle. The angle may be in one or more planes parallel to a radial to the axis of rotation D and open into the hollow shaft 18 from the side.

As shown in FIG. 3, the hollow shaft 18 has, unlike shaft 9 shown in FIG. 1, not just a single hollow channel as an oil supply line but rather two longitudinal channels 14, 15 which extend parallel in an axial direction. Channels 14, 15 are arranged eccentrically outside the axis of rotation D, and one of which channels 14, 15 serves as a lubricant feed line and the other as a lubricant discharge line. It is within the scope of the present disclosure to arrange one of the longitudinal channels 14, 15 centrically and the other one eccentrically.

From the longitudinal channels 14, 15, the transverse holes 16a, b, 17a, b each lead outward from the longitudinal channels or lines 14, 15. Transverse holes 16a, b, 17a, b, each may be oriented, for example, parallel, or alternatively at an angle, to the radial direction and arranged offset from one another axially in the direction of the axis of rotation D. The two associated transverse holes 16a, b and 17a, b, respectively, are oriented parallel to each other. However, they can also enclose an angle to each other and/or to the radial direction relative to the axis of rotation D which, as shown, extends centrically between the two longitudinal channels 14, 15. The transverse holes 16a, b, 17a, b, are oriented parallel or at an angle to the radial such that a respective pumping or suction effect is generated at the transverse holes 16a, b, 17a, b, while the hollow shaft 18 rotates during operation.

In particular, two respective adjacent branch channels or transverse holes 16a, b and 17a, b, respectively, are oriented in such a way that in each case oil is pumped into one of the longitudinal channels, for example the channel 14, through one of the transverse holes, for example the hole 16a, and air, if appropriate with a low oil content, is discharged from the other longitudinal channel, for example the channel 15, through the other transverse hole, for example, the hole 16b.

Two of the transverse holes 16a, b; 17a, b, of which, for example, there are in total four, open outward into a common annular space 19 of a rotary lead-through element 32 surrounding the shaft 18 or an annular space 20 in the gear apparatus 1. A type of rotary lead-through between the non-rotating and the rotating system is implemented on the rotary space 19 which opens into the line 6 which is connected to the oil compensating container 7.

The annular space 20 is connected to the elements to be lubricated, such as the bearings 2.

It is advantageous if the transverse holes 16a, b; 17a, b are formed in a peeling disk-like manner and independently of the direction of rotation in such a way that one channel 14 pumps and the other channel 15 draws in.

FIG. 3b is a section perpendicular to the plane of the sheet along the line A. FIG. 3c is a similar section on the line B, FIG. 3d is a section on the line C and FIG. 3e is a section on the line D.

The annular space 19 is connected to the line 6 to the oil compensating container 7. This provides a defined lubricant circuit 5 for a decanter gear apparatus 1 in a simple manner.

As shown in FIG. 4, the transverse holes 16a, 16b open into annular spaces 19a, 19b of a rotary lead-through element 32 surrounding the shaft 18, the annular spaces being axially separated from each other, and from there into separate feed and discharge lines 6, 13, respectively, which are guided into the compensating container 7. A complete lubricant circuit is implemented here by the compensating container 7.

In the region of the discharge line 13, the lubricant compensating circuit 5, according to FIG. 4, is additionally provided with an optional cooling device 30 having a coolant passage 35 and/or an optional filter 34 for cooling or filtering the lubricant which may be oil. Otherwise, this arrangement corresponds to that of FIG. 3.

As shown in FIG. 5, the transverse holes 16a, 16b open into annular spaces 19a, 19b of the rotary lead-through element 32 surrounding the shaft 18, the annular spaces being axially separated from each other, and from there into separate feed and discharge lines 6, 13 which are guided in this case separately from each other into the compensating container 7. A complete lubricant circuit is implemented here through the compensating container 7.

Figure 7:
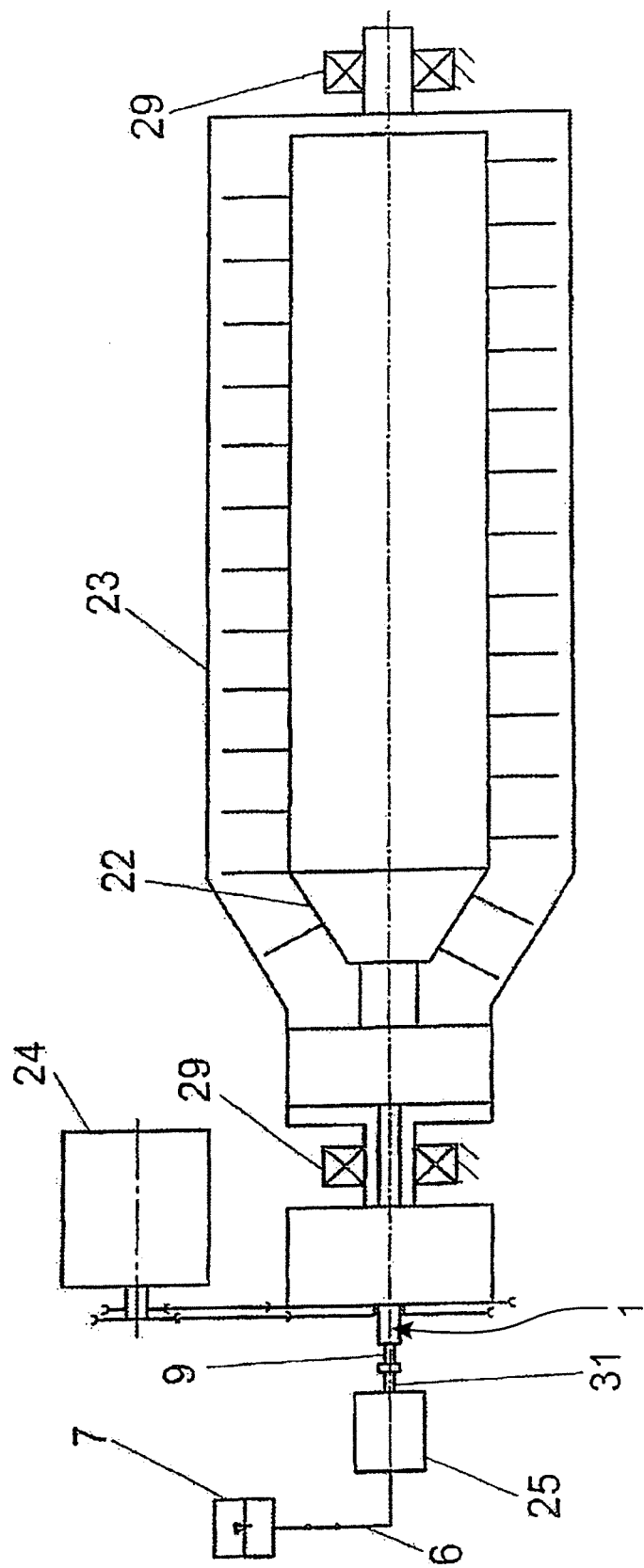

FIG. 7 shows a solid bowl screw centrifuge. The gear apparatus of which has a lubricant compensating container 7 which guides oil into a hollow shaft 31 penetrating the drive motor 25 via a line 6 and a rotary lead-through (not shown). The hollow shaft 31 is arranged directly in the axial extension of the hollow shaft 9 and connected thereto in a rotationally fixed and oil-tight manner.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A gear apparatus for a solid-bowl screw centrifuge, the gear apparatus including a shaft, a gear, and a bearing, the centrifuge including a drum and a screw, both of which drum and screw are configured to be driven and the screw further configured to be driven at a different rotational speed relative to the drum, the gear apparatus being connected between one or more drive motors and the screw and the drum, the gear apparatus being continuously filled with a lubricant, and the gear apparatus comprising:
    a hollow drive shaft including two hollow longitudinal channels;
    an associated lubricant compensating system for lubricating the bearing and including a lubricant compensating container, the lubricant compensating container being connected via a line to the two hollow longitudinal channel;

wherein the hollow drive shaft is coupled to one of the drive motors, the drive motor being a direct drive motor to drive the screw, the coupling being in the axial extension of a main axis of rotation of the gear apparatus, and a lubricant from the lubricant compensating container is fed through transverse holes which extend at an angle perpendicular to the main axis of rotation and open into the hollow drive shaft; and wherein the longitudinal channels extend eccentrically to the main axis of rotation or a first of the longitudinal channels extends centrically relative to the main axis of rotation and a second of the longitudinal channels extends eccentrically or coaxially with the first of the longitudinal channels.

2. The gear apparatus as claimed in claim 1, wherein the lubricant compensating system is a lubricant compensating circuit.

3. The gear apparatus as claimed in claim 1, wherein one of the drive motors is arranged directly in an axial extension of the hollow drive shaft.

4. The gear apparatus as claimed in claim 1, wherein the line from the lubricant compensating container into the hollow channels of the hollow drive shaft is carried out through a hollow shaft portion of the drive motor.

5. The gear apparatus as claimed in claim 1, wherein lubricant is fed out of the lubricant compensating container into the hollow drive shaft through a rotary lead-through and at least one hole into the hollow longitudinal channels extending axially in the hollow drive shaft of the gear apparatus.

6. The gear apparatus as claimed claim 1, wherein lubricant is fed from the lubricant compensating container into the line, and through a rotary lead-through arranged in an axial extension of the hollow drive shaft of the gear apparatus.

7. The gear apparatus as claimed in claim 1, wherein lubricant from the lubricant compensating container flows through the channels branching off from the hollow drive shaft to elements to be lubricated of the gear apparatus, from which it enters at least one annular space having a lubricant level.

8. The gear apparatus as claimed in claim 7, wherein the lubricant level in the annular space is limited.

9. The gear apparatus as claimed in claim 8, wherein the lubricant level in the annular space is limited by a conveying means.

10. The gear apparatus as claimed in claim 9, wherein the conveying means is a peeling disk element configured such that during an operation it discharges lubricant into a discharge line in a manner of a centripetal pump.

11. The gear apparatus as claimed in claim 10, wherein the peeling disk element is a scoop tube which allows lubricant to be discharged from a radially outer region of the gear apparatus into a radially inner region of the gear apparatus.

12. The gear apparatus as claimed in claim 1, wherein the transverse holes are each arranged so as to be offset from one another axially in the direction of the main axis of rotation.

13. The gear apparatus as claimed in claim 1, wherein the transverse holes are each oriented at an angle to a radial direction.

14. The gear apparatus as claimed in claim 1, wherein the transverse holes are each oriented parallel to a radial direction.

15. The gear apparatus as claimed in claim 1, wherein the transverse holes are oriented such that during an operation a respective pumping or suction effect is generated at the transverse holes during a rotation of the hollow drive shaft.

16. The gear apparatus as claimed in claim 1, wherein the lubricant compensating circuit includes a cooling device.

17. The gear apparatus as claimed in claim 1, wherein the lubricant compensating circuit includes a filter.

18. The gear apparatus as claimed in claim 1, wherein the transverse holes open into at least one common annular space.

19. A gear apparatus for a solid-bowl screw centrifuge, the gear apparatus including a shaft, a gear, and a bearing, the centrifuge including a drum and a screw, both of which drum and screw are configured to be driven and the screw further configured to be driven at a different rotational speed relative to the drum, the gear apparatus being connected between one or more drive motors and the screw and the drum, the gear apparatus being continuously filled with a lubricant, and the gear apparatus comprising:

a hollow drive shaft including two hollow longitudinal channels;

an associated lubricant compensating system for lubricating the bearing and including a lubricant compensating container, the lubricant compensating container being connected via a line to the two hollow longitudinal channel;

wherein the hollow drive shaft is coupled to one of the drive motors, the drive motor being a direct drive motor to drive the screw, the coupling being in the axial extension of a main axis of rotation of the gear apparatus, and a lubricant from the lubricant compensating container is fed through transverse holes which extend at an angle perpendicular to the main axis of rotation and open into the hollow drive shaft; and wherein two respective adjacent holes of the transverse holes are oriented in such a way that lubricant is pumped into one of the longitudinal channels and through one of the transverse holes, and air and lubricant are discharged out of the other longitudinal channel through the other transverse hole.

20. A gear apparatus for a solid-bowl screw centrifuge, the gear apparatus including a shaft, a gear, and a bearing, the centrifuge including a drum and a screw, both of which drum and screw are configured to be driven and the screw further configured to be driven at a different rotational speed relative to the drum, the gear apparatus being connected between one or more drive motors and the screw and the drum, the gear apparatus being continuously filled with a lubricant, and the gear apparatus comprising:

a hollow drive shaft including two hollow longitudinal channels;

an associated lubricant compensating system for lubricating the bearing and including a lubricant compensating container, the lubricant compensating container being connected via a line to the two hollow longitudinal channel;

wherein the hollow drive shaft is coupled to one of the drive motors, the drive motor being a direct drive motor to drive the screw, the coupling being in the axial extension of a main axis of rotation of the gear apparatus, and a lubricant from the lubricant compensating container is fed through transverse holes which extend at an angle perpendicular to the main axis of rotation and open into the hollow drive shaft; and wherein the transverse holes are formed as a peeling disk, and independently of a direction of rotation, one of the longitudinal channels pumps and one of the longitudinal channels draws in.

21. A gear apparatus for a solid-bowl screw centrifuge, the gear apparatus including a shaft, a gear, and a bearing, the centrifuge including a drum and a screw, both of which drum and screw are configured to be driven and the screw further configured to be driven at a different rotational speed relative to the drum, the gear apparatus being connected between one or more drive motors and the screw and the drum, the gear apparatus being continuously filled with a lubricant, and the gear apparatus comprising:
- a hollow drive shaft including two hollow longitudinal channels;
- an associated lubricant compensating system for lubricating the bearing and including a lubricant compensating container, the lubricant compensating container being connected via a line to the two hollow longitudinal channel;
- wherein the hollow drive shaft is coupled to one of the drive motors, the drive motor being a direct drive motor to drive the screw, the coupling being in the axial extension of a main axis of rotation of the gear apparatus, and a lubricant from the lubricant compensating container is fed through transverse holes which extend at an angle perpendicular to the main axis of rotation and open into the hollow drive shaft;
- wherein the transverse holes open into two annular spaces of a rotary lead-through element surrounding the hollow drive shaft, the annular spaces being axially separated from each other; and
- wherein a feed line and a discharge line are guided into the lubricant compensating container, the feed and discharge lines being separated from the two annular spaces) of the rotary lead-through element.

* * * * *